March 31, 1959 J. A. SINK 2,880,272

ELECTRICAL SYSTEMS

Filed July 25, 1955 2 Sheets-Sheet 1

INVENTOR.
JAMES A. SINK
BY
[signature]
ATTORNEY

March 31, 1959 J. A. SINK 2,880,272

ELECTRICAL SYSTEMS

Filed July 25, 1955 2 Sheets-Sheet 2

INVENTOR.
JAMES A. SINK
BY
Allen V. Hazeltine
ATTORNEY

United States Patent Office 2,880,272

Patented Mar. 31, 1959

2,880,272

ELECTRICAL SYSTEMS

James A. Sink, Philadelphia, Pa., assignor to Philco Corporation, Philadelphia, Pa., a corporation of Pennsylvania Application July 25, 1955, Serial No. 524,095

3 Claims. (Cl. 178—7.3)

This invention relates generally to electrical systems and more specifically to improvements in the control of circuits particularly useful in television receivers for separating the synchronizing pulses from a received composite video signal and for deriving automatic gain control potentials from these synchronizing pulses.

In television receivers it is necessary to provide circuit means which will function to separate the synchronizing pulses from a received composite video signal. These separated synchronizing pulses are then supplied to convenient scanning apparatus where they are employed in the reproduction of the image to be reproduced. Noise of sufficient amplitude appearing in the composite video signal can cause the output of the scanning apparatus to become asynchronous, thus causing distortion of the image to be reproduced. Consequently, a second circuit means which functions to eliminate or attenuate such noise is desirable. A third circuit means employed in television receivers is one which functions to produce an automatic gain control potential which is fed back to the radio frequency amplifiers and/or the intermediate frequency amplifiers of the television receiver to control the sensitivity thereof. This third circuit means is usually constructed so that the magnitude of the automatic gain control potential varies as the average strength of the composite video signal and the production thereof is delayed until the average strength of the received composite video signal reaches a certain magnitude. It is desirable to decrease or increase this delay in accordance with whether the received composite signal is strong or weak respectively. For example, if the received signal is weak, it is advantageous to have little or no automatic gain control potential since the received signal would only be weakened more thereby. On the other hand a relatively large automatic gain control potential is normally required for a strong signal.

Various specific circuits exist in the prior art which are capable of performing the three functions mentioned above. In the utilization of these specific circuits it has been found necessary to provide means for adjusting the noise suppression circuit and other means for adjusting the amount of delay in the production of the automatic gain control potential. Heretofore individual adjustments have been required for these two purposes. The present invention accomplishes said two purposes with circuit means having only a single adjustment.

In a specific example of prior art over which the present invention constitutes an improvement the synchronizing pulse separator circuit comprises a vacuum tube having a first control grid which is negatively self biased by means of a grid leak circuit to which is applied a positively poled composite video signal. This self bias is created in a well known manner involving a current flow from the cathode of the tube to the said first control grid to charge a capacitor which forms a part of the grid leak circuit. The amount of self bias varies in response to the strength of the composite signal in such a manner that the tips of the synchronizing pulses remain substantially at the potential of the tube cathode. The circuit constants are so selected that only the synchronizing pulses are above the cut-off potential of the tube. Thus only the synchronizing pulses will appear in the plate output of the tube.

However, noise pulses, whose magnitudes are greater than the magnitude of the synchronizing pulses, will tend to cause the said first control grid to become self biased in a greater amount than would be the case if the amount of self bias were determined solely by the effect of the synchronizing pulses.

Consequently the tips of the synchronizing pulses will be forced downward below cathode potential and towards cut-off potential. If the noise pulses are of a sufficiently large magnitude and occur with sufficient frequency the entire composite video signal including the synchronizing pulses could fall below cut-off potential and thus be rejected by the synchronizing pulse separator circuit. Such a condition is known as backoff. In addition to the disadvantage just set forth, noise pulses whose magnitudes are larger than the magnitude of the synchronizing pulses will, in the absence of a noise suppression circuit, produce noise in the output of the synchronizing pulse separator circuit. This will also produce distortion in the image to be reproduced.

The effect of such large noise pulses is eliminated from the output of the synchronizing pulse separator circuit by supplying to a second control grid of the vacuum tube the same composite video signal that is supplied to said first control grid except that the magnitude of the signal supplied to said second control grid is different and the polarity thereof is in a negative direction. The second control grid is biased positively with respect to the cathode of the vacuum tube by a D.-C. potential having a magnitude such that, although the tips of the synchronizing pulses of the composite video signal applied to said second control grid will not drive the potential of the second control grid below cathode potential, large noise pulses will. Thus the plate current of the vacuum tube which constitutes the output of the separator circuit is diminished or entirely cut off during said large noise pulses, depending on the magnitude thereof. Further, since the plate current of the tube is cut off during sufficiently large noise pulses, there can be no current flow from the cathode to the first control grid thereof to charge the capacitor of the grid leak circuit. Thus any increase in the self bias of said first control grid due to noise pulses is effectively prevented. Consequently backoff is prevented. For proper operation the D.-C. bias applied to the second control grid must be adjusted in accordance with the magnitude of the synchronizing pulses. As indicated before, the prior art accomplishes this by means individual thereto such as, for example, a potentiometer arrangement.

To produce an automatic gain control potential having a delay which can be varied, well known structure can be employed. For example, this structure may comprise a diode whose anode is connected through an impedance to a potential source which is positive with respect to the potential of the diode cathode. The anode will then be clamped at cathode potential. A signal, whose average magnitude varies as the average magnitude of the synchronizing pulses of the composite video signal, and which is also supplied to the anode of said diode through appropriate circuit means, must decrease to some predetermined value which is negative with respect to the potential of the diode anode before the potential of said anode is decreased. Thus the production of the automatic gain control potential, which may be taken directly from said anode, is delayed. The amount of this delay can be varied in accordance with variations in the magnitude of said potential source to which the diode anode is connected. Such variations are made in prior art devices by means individual thereto such as, for example, a potentiometer arrangement.

Thus in prior art devices, separate means for adjusting the noise suppression circuit, and for adjusting the delay in producing automatic gain control potential, are required.

The present invention overcomes this disadvantage by providing circuitry comprising a single control means which simultaneously will effect both of the above-mentioned adjustments.

It is an object of this invention to provide an improved electrical system for separating regularly time spaced pulses contained in an applied signal and for deriving an automatic gain control potential from said regularly time spaced pulses.

Another object of the invention is to provide an improved synchronizing pulse separator and automatic gain control system especially adapted for use in television systems and characterized by commercially satisfactory performance even when supplied with composite video signals having large noise components therein.

A further object of the invention is to provide an improved synchronizing pulse separator and automatic gain control system which can be adjusted by a single control element to produce simultaneously the proper delay in the automatic gain control potential and the optimum suppression of noise pulses in the synchronizing pulse separating circuit for a composite video signal of a given average strength.

A fourth object of the invention is to provide an improved synchronizing pulse separator and automatic gain control system which, under poor signal-to-noise conditions, can be adjusted by a single control element to produce simultaneously, an increase in the delay of the automatic gain control potential, a reduction in the value of the automatic gain control potential, the elimination of a substantial portion of the noise pulses from the output of the synchronizing pulse separating circuit, and the prevention of backoff.

An additional object of the invention is the improvement of synchronizing pulse separator and automatic gain control systems generally.

The foregoing objects are achieved in accordance with the invention which comprises, in combination with the aforementioned synchronizing pulse separator with its noise suppression circuit and the circuit for producing the automatic gain control potential, a network means having a single control element. This network is constructed in such a manner that the single control element can be adjusted, for received composite video signals of different given average strengths, to produce simultaneously two output potentials whose magnitudes are of optimum value for the functions they are to perform. The first of these potentials determines the amount of delay of the automatic gain control potential and the second output potential determines the D.-C. bias for the aforementioned second control grid which forms a part of the noise suppression circuit as described hereinbefore.

In accordance with a specific embodiment of said network there is provided first potential divider means having a first tap therein from which the positive D.-C. bias for said second control grid is derived and second potential divider means having a second tap therein from which is derived the potential for determining the amount of delay of the automatic gain control potential. The resistive elements on one side of the taps of the two potential dividers are connected together to form one continuous resistive element between the said first and second taps. A single control element means, such as a movable contact, is provided to complete a circuit from a selectable point on said continuous resistive element to the battery supply means for said two potential dividers. Movement of said single control element will vary the potential of said first and second taps in an inverse relationship.

The objects and features of the invention will be more fully understood from the following detailed description when read in conjunction with the drawings in which.

Figure 1:
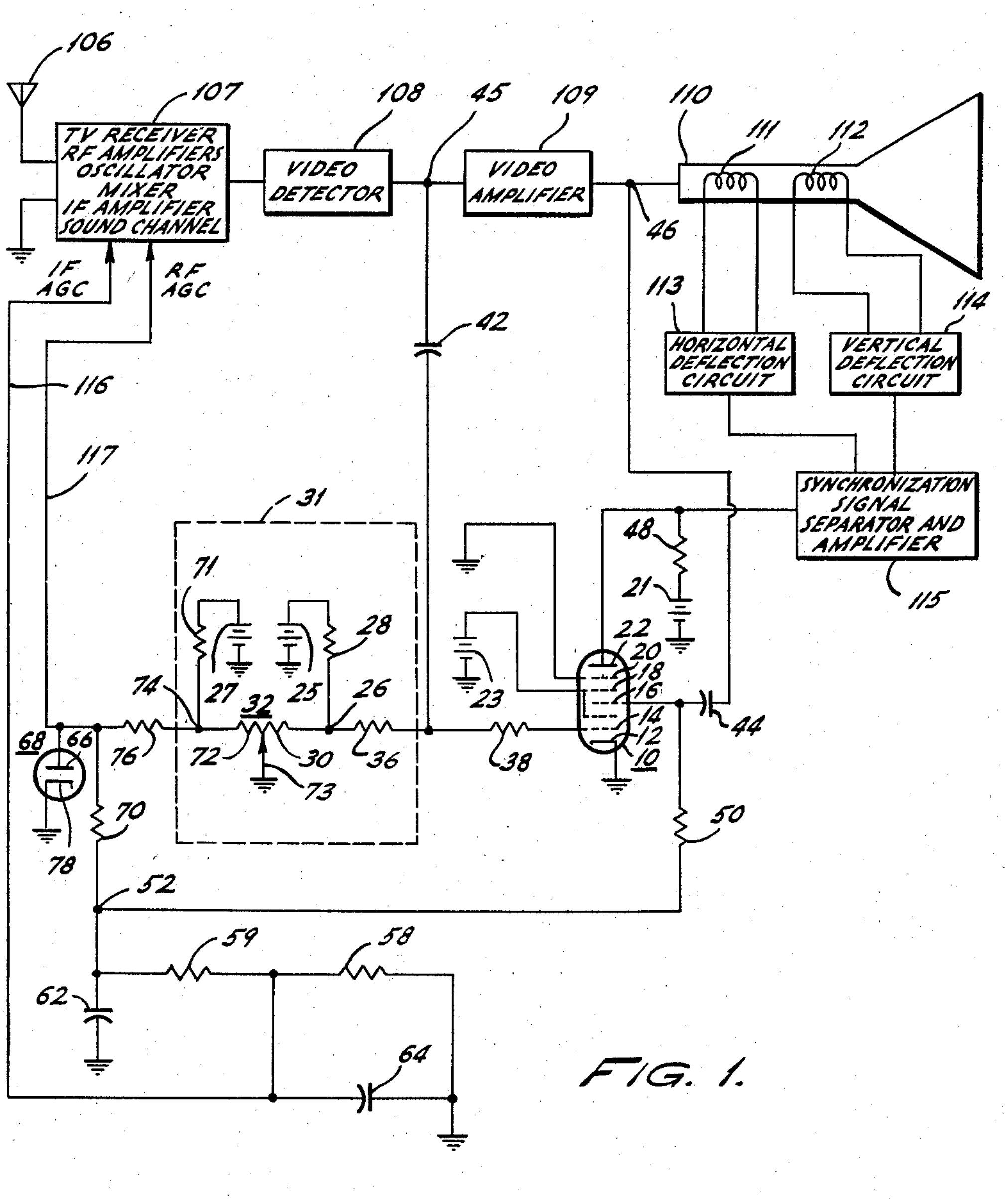
Figure 1 is a schematic sketch of an embodiment of the invention.

Referring now to Figure 1 the part of the circuit shown in schematic form embodies the invention, and the part of the circuit shown in block diagram is included to illustrate generally how the invention fits into a television receiver.

The block diagram portion of the circuit will be discussed first to provide a background for a better understanding of the schematic portion of Figure 1. The signal is intercepted by antenna 106 and applied to block 107 which comprises the radio frequency amplifiers, the local oscillator, the mixer, the intermediate frequency amplifiers, and the sound channel. The signal from the intermediate amplifiers is then supplied to the video detector 108 where it is detected. From the detector 108 the composite video signal is supplied to the video amplifier 109. From the video amplifier 109 the signal is supplied to image reproducing means 110. The total synchronizing signal, including both the vertical and the horizontal synchronizing pulses, which appears at the plate of tube 10, as will be discussed later, is supplied to the block 115 which functions to separate the horizontal synchronizing pulses from the vertical synchronizing pulses and to supply the separated synchronizing signals to the horizontal and vertical deflection circuits represented by the blocks 113 and 114. The circuits represented by block 113 and 114 function to generate the proper horizontal and vertical deflection signals which are supplied to the horizontal and vertical deflection coils 111 and 112.

The schematic part of the circuit of Figure 1 has four different portions, each of which performs a different function. These four functions are: first, to separate the synchronizing pulses from the composite video signal, secondly, to eliminate the effect of large noise pulses upon the synchronizing pulse separator portion of the circuit, thirdly to provide automatic gain control potential having a delay in the production thereof and which is derived from the composite video signal and whose magnitude varies as the amplitude of the synchronizing pulses, and fourthly to enable an operator, by the manipulation of a single control, to simultaneously adjust the circuit of Figure 1 to eliminate large noise pulses and to produce an automatic gain control potential having the proper delay and magnitude for an applied composite video signal of a given strength.

It is to be noted that the first three portions of the schematic circuit of Figure 1 by themselves do not separately, or in combination, constitute part of the invention. The invention embraces the structure of the said fourth portion of the circuit (within the rectangle 31) in combination with said first three portions of the circuit, and the manner in which the said fourth portion is employed to coact with the other portions of the circuit.

Figure 2:
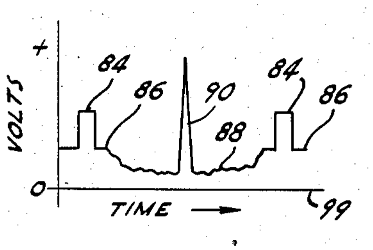
Figures 2 through 6 represent potentials at various points in the circuit of Figure 1.
Figure 3:
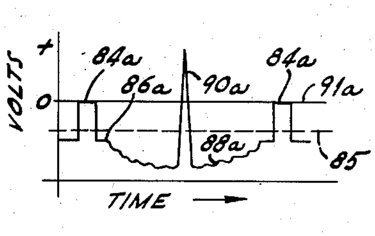
Figure 4:
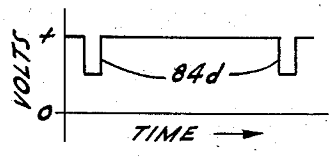

The portion of the schematic part of the circuit of Figure 1 which separates the synchronizing pulses from the composite video signal will be described first. This portion of the circuit comprises the pentode 10 including cathode 12, control grid 14, screen grid 18, control grid 16, suppressor grid 20, and anode 22, and also comprises a grid leak circuit which is connected to the control grid 16. This grid leak circuit, which comprises capacitor 44 and resistor 50, functions in a well known manner in cooperation with the rectifier formed by the control grid 16 and the cathode 12 of tube 10 to provide for the control grid 16 a negative bias. The magnitude of this negative bias varies in accordance with the magnitude of the synchronizing pulses of the composite video signal supplied to the point 46. The tips of the synchronizing pulses of the applied composite video signal will extend slightly positive with respect to the cathode potential to maintain the bias potential existing across capacitor 44. A portion of a typical composite video signal supplied to the point 46 is represented by the curve of Figure 2. This signal may be obtained from a convenient point in the television receiver such as, for example, the output of the video amplifier 109 following the video detector 108. In this curve the regularly spaced synchronizing pulses 84 extend in a positive direction and recur at the line scanning rate of the signal to be reproduced. Further, the synchronizing pulses 84 extend beyond the blanking pedestals 86, and, interposed between successive blanking pedestals, are the less positive going portions 88 of the signal which correspond to the image information to be reproduced. Due to the bias created by the grid leak circuit, the instantaneous signal appearing at the control grid 16 of Figure 1 (represented by the curve of Figure 3) is such that the blanking level 86a of the composite video signal is just below the broken line 85 which represents the cutoff potential of the control grid 16. Only the portions of the synchronizing pulses above the cutoff potential will produce an output at the anode of the tube. Such an output is represented by the curve of Figure 4 in which the pulses 84d represent the separated synchronizing pulses.

The portion of the circuitry which functions to eliminate large noise pulses will now be considered.

Figure 5:
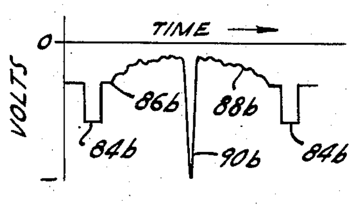

The composite video signal received by the television receiver rarely will be free of spurious noise pulses. Rather, as indicated hereinbefore, it will frequently contain many spurious noise pulses such as the one indicated by the reference character 90 in the curve of Figure 2. This noise pulse, which is representative of typical noise pulses found in a composite video signal, extends in the same polarity sense (positive) as the synchronizing pulses 84, and has an amplitude which in many instances is larger than that of the synchronizing pulses. It is to be noted that any noise pulse impressed upon the grid 16 of tube 10 (Figure 1), when the potential of the grid 16 is above cutoff, will produce noise output at the plate 22 of the tube 10. If the magnitude of the noise pulse is greater than the magnitude of the synchronizing pulses, backoff will be produced. Although all such noise is undesirable in varying degrees, only those noise pulses whose amplitudes are greater than that of the synchronizing pulses will be suppressed by the circuitry shown in Figure 1. The noise pulse represented by the reference character 90 of Figure 2 falls in this category. Except for a change in amplitude and a reversed polarity the same composite video signal, point for point, that is supplied to the point 46 is also supplied to the point 45 from some convenient point in the television receiver, such as for example the output of the video detector 108. The waveform of the signal at point 45 is represented by the curve of Figure 5. From the point 45 the composite video signal is supplied to the control grid 14 through the capacitor 42 and current limiting resistor 38. The overall purpose of supplying this negatively poled composite video signal to control grid 14 is to cut off, either partially or completely, the tube 10 plate current only during noise pulses whose amplitudes are larger than the amplitude of the synchronizing pulses, so that said noise pulses will not appear in the output of the tube 10 and further to prevent backoff. However it is not desirable that the synchronizing pulses supplied to the grid 14 also act to cut off, either partially or completely, the tube 10 plate current, since to do so would decrease or eliminate the output of the separator circuit. To prevent such an occurrence, a positive D.-C. bias is supplied to said grid 14 by means of circuitry within the block 31. This bias is of such a value that the tips of the synchronizing pulses will drive the potential of the grid 14 to a point just above cathode 12 potential, whereas noise pulses whose amplitudes exceed that of the synchronizing pulses will drive the potential of the grid below cathode potential, and below cutoff potential if the amplitude is great enough. The circuitry within the block 31 comprises a potential divider which includes resistor 28 and the resistive element 30 of the potentiometer 32. The potential divider is connected between the positive terminal of the battery 25 and ground potential through the movable arm 73 of potentiometer 32. By adjusting the movable arm 73, the potential of the point 26 can be increased or decreased, thus increasing or decreasing the positive bias on the control grid 14 in accordance with an increase or decrease in the strength of a given applied composite video signal.

The third portion of this circuit functions to provide automatic gain control potential and can be divided into two parts. The first of these two parts functions to provide automatic gain control potential for the radio frequency amplifiers of the television receiver and the second part functions to provide automatic gain control potential for the intermediate frequency amplifiers.

The said first part of the third portion of the circuit of Figure 1 is constructed to produce an automatic gain control potential on conductor 117 from which it is supplied to the radio frequency amplifiers (block 107) of the television receiver. The automatic gain control potential in a television receiver is normally derived from the composite video signal and has a magnitude which varies generally as the average strength of the composite video signal. The composite video signal appearing at the control grid 16 is utilized herein for the production of the automatic gain control potential since it is convenient and further since back off has been eliminated by the operation of the noise suppression circuit as described hereinbefore. The capacitor 62 functions as a filter to produce at the point 52 a unilateral signal whose magnitude varies as the average strength of the video signal appearing at the control grid 16. Under certain conditions, however, as for example when the signal-to-noise ratio of the received composite video signal is moderate-to-low, in order to maintain a desirable level of sensitivity in the radio frequency amplifiers, production of the automatic gain control potential is delayed until the composite video signal has reached a certain amplitude. Thus the potential appearing at the point 52 cannot be used directly as the automatic gain control potential since there is no delay therein.

Such a delay further provides for a greater degree of sensitivity in the production of automatic gain control potentials in that, when the automatic gain control potential is produced, its magnitude will increase or decrease at a faster rate than the magnitude of the contemporaneous composite video signal from which it is derived.

The aforementioned delay is produced by maintaining the point 74 at a positive potential with respect to ground which is accomplished by the circuitry comprising battery 27, resistor 71, and resistive element 72. This will produce a current flow therefrom to ground through the resistor 76 and the diode 68 which comprises a plate 66 and a cathode 78 and which functions to clamp conductor 117 to a maximum potential equal to ground potential.

As the potential of the grid 16 goes negative with respect to ground by virtue of the video signal being supplied thereto, and the capacitor 62 acquires a negative charge, some of the current flowing from the point 74 through the resistor 76 and the diode 68 to ground will be diverted from the diode 68 and caused to flow through the resistors 70 and 50 to the capacitor 62 and the control grid 16. However, all of the current flowing through the diode 68 from the point 74 must be diverted from the diode 68 and caused to flow through resistors 70 and 50 to the capacitor 62 and to the negative going control grid 16 before the potential of the conductor 117 becomes negative with respect to ground. When all of the current is diverted from the diode 68 and caused to flow through the resistors 70 and 50, the potential of the control grid 16 will have been decreased to a particular negative value. This particular negative potential constitutes the amount of the aforementioned delay.

It is to be noted that, if the potential of the point 74 is increased, all other factors remaining unchanged, the delay will be increased since a larger current will initially flow through the resistor 76 and the diode 68 to ground. Thus the potential of the control 16 will have to swing more negative in order to divert said larger current. Conversely, a decrease of the potential of the point 74 will produce a decrease in said delay.

The automatic gain control potential for the intermediate frequency amplifiers in the particular embodiment of the invention shown in Figure 1 is obtained through the potential divider comprising resistors 58 and 59 which are shunted by the filtering capacitor 62. The by-pass capacitor 64 shunts the resistor 58. If desired, a delay means can be incorporated in the circuitry for producing the automatic gain control potential which is to be supplied back to the intermediate frequency amplifiers.

It is to be understood that it is not necessary that the automatic gain control potential be derived from the potential of the control grid 16. Any convenient method of deriving a potential whose magnitude varies as the magnitude of the synchronizing pulses of the composite video signal may be employed in lieu of the potential of the control grid 16.

The fourth portion of the circuit of Figure 1, which constitutes the essence of the invention, is contained within the block 31. As stated before this circuit is constructed so that a single control element can be adjusted for received composite video signals of different average strangths, to produce simultaneously, two output potentials whose magnitudes are of optimum value for the functions they are to perform. One of these potentials determines the amount of delay of the automatic gain control potential and the other potential determines the D.-C. bias for the control grid 14 of tube 10. To illustrate the principles of the invention there is included within the block 31 a specific circuit which will perform the above-mentioned functions. The invention is not, however, limited to this specific circuit. In the specific circuit shown within the block 31, adjustment of movable arm 73 of the potentiometer 32, which also comprises resistive elements 30 and 72, functions to adjust simultaneously the circuit of Figure 1 for elimination of large noise pulses and for the production of an automatic gain control potential which has the proper delay for a received composite video signal of a given average strength. More specifically in the case of a strong average composite video signal where the signal-to-noise ratio is high, moving arm 73 to the left in Figure 1 will decrease the potential of the point 74, thus decreasing the delay and increasing the automatic gain control potential, and simultaneously will increase the potential of the point 26. Increasing the potential of the point 26 will increase the positive bias of the grid 14 so that a larger synchronizing pulse can be applied thereto without cutting off the plate current of the tube 10. Moving the arm 73 to the right will increase the potential of point 74 thus increasing the said delay and decreasing the automatic gain control potential. Simultaneously the potential of point 26 will be decreased, thus decreasing the potential of grid 14 to maintain the potential of the tips of synchronizing pulse of a weak signal just above the cut-off potential of the control grid 14.

In addition to the specific circuit just set forth many other circuits can be employed in the block 31 to produce the same results. For example, individual potentiometers may be employed to produce the D.-C. bias for control grid 14 and to determine the amount of delay. Mechanical means having a single control element can be utilized to operate the said individual potentiometers simultaneously. Additionally it is not necessary that the control element such as movable arm 73 be constructed to produce a continuous adjustment. A multiple contact switch having separate positions for strong signals, medium signals, and weak signals, for example, can be employed to further simplify the control.

Up to this point the four portions of the circuit of Figure 1 have been described in a general manner. The circuit will now be discussed in more detail with emphasis on the operation thereof and with reference to the curves of Figures 2 through 7. It is to be noted that the Figures 2 through 7 all have a common time scale along their abscissas. Further the elements of Figures 2 through 6 having the same reference characters (although with different subscripts) are corresponding elements.

Consider first the portion of the circuit designed to separate the synchronizing pulses from the composite video signal. The positive going composite video signal, represented by the curve of Figure 2, is supplied to the point 46 from the video amplifier 109, thence to the control grid 16 of tube 10 through capacitor 44 which forms a part of a grid leak circuit as described hereinbefore. A biasing potential for the control grid 16 is thereby created across the capacitor 44 having a magnitude which is proportional to the average strength of the received composite video signal. This biasing potential will have a polarity such that the negative plate of capacitor 44 is connected to the control grid 16. The instantaneous potential of the grid 16 will then be as represented by the waveform of Figure 3 which is substantially the same as the waveform of Figure 2 except that in Figure 3 the D.-C. bias existing across the capacitor 44 has been superimposed upon the waveform of Figure 2. As a result thereof ground potential in Figure 3 is as represented by the solid line 91 whereas ground potential in Figure 2 is represented by abscissa 99. The dotted line 85 of Figure 3 represents cutoff potential.

The grid leak circuit which is also known as a voltage leveling circuit functions in a well known manner to cause the said D.-C. bias on the grid 16 automatically to assume a value such that the potential of the tips of the synchronizing pulses, whether the received composite video signal be strong or weak, will be just a little more positive than the cathode potential which is at ground potential. The amount by which the potential of the tips of synchronizing pulses exceeds the cathode potential is just sufficient to replenish the electrical discharge from the capacitor 44 that occurs between synchronizing pulses. It can thus be seen that the potential of the plate 22 of tube 10 will decrease to substantially the same value at each peaking of a synchronizing pulse regardless of the strength of the received video signal. On the other hand the various electrodes of the tube 10 are so biased that the cutoff potential of the control grid 16 is a little above the blanking level of the composite video signal. This blanking level is identified by the reference character 86a in Figure 3. Consequently the tube 10 will be cut off before the potential of the synchronizing pulses decreases to the blanking level and the plate potential thereof will always increase to substantially the same potential before and after each synchronizing pulse. Thus the tube 10 functions as a clipper to produce separated synchronizing pulses which have substantially the same amplitude whether the received composite video signal be strong or weak. These separated pulses are represented by the pulse waveforms 84d of Figure 4.

The operation of the circuitry provided to eliminate noise pulses will now be described in detail.

As stated hereinbefore the control grid 14 ordinarily is maintained at a potential which is positive with respect to the potential of the cathode ray tube 12 by means of a potential divider comprising resistor 28 and the resistive element 30 of potentiometer 32. This potential divider is connected between the positive terminal battery 25 and ground potential through movable arm 73 of potentiometer 32. Thus the potential of point 26 thereof, to which the control grid 14 is connected through resistors 36 and 38, is normally positive with respect to ground potential.

The compositive video signal represented by the waveform of Figure 5 is supplied to the control grid 14 through the capacitor 42 and the current limiting resistor 38. As stated hereinbefore, this composite video has a waveform which, except for sense and amplitude, corresponds point for point with the composite video signal supplied to point 46 and which is represented by the waveform of Figure 2.

Figure 6:
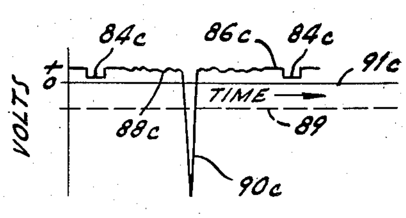

Since the control grid 14 is normally biased positive with respect to cathode 12, the said control grid 14 will normally draw a grid current. Negative signals which are applied to grid 14, and which are of insufficient magnitude to lower the potential of the grid 14 below that of the cathode 12, will produce corresponding changes in the grid current but will not produce very large changes in the plate current of the tube 10. The reasons for this are the following. It is characteristic of the tube 10 that while the potential of the control grid 14 is positive with respect to the potential of the cathode, the grid 14-cathode 12 impedance is small. On the other hand the value of the resistor 38 is chosen so as to be relatively large compared to the grid 14-cathode 12 impedance so that most of a signal applied to the control grid 14 from the point 45 for example will appear across the resistor 38. However, this is true only so long as the grid 14 is drawing current. When the signal (of a negative polarity) supplied from the point 45 becomes of sufficient magnitude to decrease the potential of the grid 14 below that of the cathode 12, the grid current will cease and the grid 14-cathode 12 impedance will become very large compared to the value of resistor 38. Thus substantially all of the signal supplied from the point 45 will appear across the grid 14-cathode 12 impedance. This is illustrated by the curves of Figures 5 and 6. The curve of Figure 5 represents the composite video signal that is supplied from the point 45. The resultant waveform produced on the control grid 14 is repesented by the curve of Figure 6. The positive bias supplied to the grid 14 from the point 26 is caused to be of such a value that the tips of the synchronizing pulses **84*b* of Figure 5 are of insufficient amplitude to decrease the potential of the grid 14 below that of cathode 12. Thus most of the voltage representing the synchronizing pulses will appear across resistor 38, and an attenuated signal represented by the pulses 84*c* of Figure 6 will appear across the grid 14-cathode 12 gap. Thus the plate current of tube 10 is only slightly affected by the synchronizing pulses applied to the control grid 14. However, the noise pulse 90*b* of Figure 5 is of sufficient magnitude to drive the potential of the grid 14 below that of cathode 12. Consequently the grid 14 will draw no current during this time and substantially the entire strength of the pulse 90*b* of Figure 5 will appear across the grid 14-cathode 12 gap as indicated by the pulse 90*c*** of Figure 6.

The amplitude of a noise pulse can lie in either of two potential ranges. The first of these two ranges is between cathode potential indicated by the solid line **91*c* of Figure 6 and the grid 14 cutoff potential indicated by the broken line 89. The second range is below the grid 14 cutoff potential. Noise pulses whose amplitudes are within said first range will not cut off the plate current of the tube 10 but will attenuate the noise output in accordance with the degree to which the applied noise pulse causes the grid 14 to approach cutoff potential. Noise pulses whose amplitude lie within said second range will cut off the plate current of the tube 10**.

As stated before the pulse **90*c* of Figure 6 has an amplitude which drives the potential of the control grid 14 below cutoff to cut off the plate current of the tube 10. Thus the corresponding noise pulse 90, appearing in the waveform of Figure 2 which represents the composite video signal applied to the control grid 16, will not appear in the output at the plate 22 of tube 10. Further, the cutting off of the tube 10** plate current during this noise pulse will prevent backoff as described hereinbefore.

The operation of the potentiometer 32 will now be described in detail. As stated hereinbefore the circuitry within the block 31 and its relationship with the other portions of the circuit constitutes the essence of the invention. This relationship is such that, for a received composite video signal of a given strength, the movable arm 73 can be adjusted to obtain simultaneously two results. These two results are to adjust the circuit of Figure 1 for the elimination of large noise pulses and for the production of an automatic gain control potential having the proper amplitude and delay. The movable arm 73 can be adjusted to accommodate received composite video signals having signal-to-noise ratios ranging from weak to strong. Both situations will be considered.

Assume first that the signal-to-noise ratio of the incoming signal is high. Under these circumstances it is desirable to produce a relatively strong automatic gain control potential and a relatively small delay. Further, the noise suppression circuit must be adjusted to these conditions. The movable arm 73 is moved to the left so that the potential of the point 74 is decreased and the potential of the point 26 is increased. The current flow through the resistor 76 and the diode 68 is therefore comparatively small and a relatively small negative potential produced by the grid leak circuit at the control grid 16 will produce a negative signal (automatic gain control potential) on the conductor 117. Thus the delay is small. However, the composite video signal actually applied to the control grid 16 is, in this example, large. Consequently the negative bias produced on the control grid 16 is also large, thus producing a large automatic gain control potential.

Figure 7:
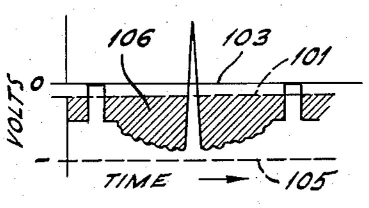
Figure 7 is a waveform showing the effects of delays of different magnitudes for composite video signals having a high signal-to-noise ratio and a low signal-to-noise ratio.

This can be seen more clearly from the curve of Figure 7 which shows the waveform of the received composite video signal as does the curve of Figure 3. However, the curve of Figure 7 additionally shows the results of various adjustments of the movable arm 73. Specifically, under the conditions set forth above, the broken line 101 is typically representative of the potential level to which the potential of the grid 16 must decrease to produce on the capacitor 62 a sufficiently negative charge to cause an automatic gain control potential to be produced on the conductor 117. The cross-hatched area 106 is then the portion of the applied composite video signal which acts to produce an automatic gain control potential. The potential difference between line 101, and line 103 which represents ground potential, constitutes the delay in the circuit.

Considering now the point 26 of Figure 1, the increase in the potential thereof will increase the bias of the control grid 14 so that the synchronizing pulses impressed upon said control grid 14 from the point 45 will not cut off the plate current of the tube 10 although the potential of the tips of the synchronizing pulses will be near enough to cathode potential so that noise pulses, whose amplitudes are greater than that of the synchronizing pulses, will lessen or cut off the plate current of tube 10.

Assume now that the composite video signal being received has a low signal-to-noise ratio. Under these circumstances it is desirable to have a large delay in the production of the automatic gain control potential and to have an automatic gain control potential having a relatively small amplitude. To obtain these results the arm 73 is moved to the right so that the potential of the point 74 is increased and the potential of the point 26 is decreased. As discussed hereinbefore the increase of the potential of point 74 will result in a large delay and will decrease the strength of the automatic gain control potential for a received composite video signal of a given average strength. Under circumstances, where the signal-to-noise ratio is very small, it might be desirable to have no automatic gain potential whatever. This can be accomplished by increasing the delay sufficiently. Such a condition is illustrated in Figure 7 where the broken line 105, which represents the level to which the potential of the control grid 16 must decrease before an automatic gain control potential is produced, is below the most negative point of the composite negative signal. Consequently no output signal is created on the output conductor 117. It is to be noted that the waveform of Figure 7 is used in connection with the description of operation in which a high signal-to-noise ratio is present and in the description of operation in which a low-signal-to-noise ratio is present. Obviously the average strength of composite video signals in the two cases would be different. However, to avoid duplication, the curve of Figure 7 is employed for both conditions.

It is to be understood that the form of the invention shown and described herein is but a preferred embodiment of the same and that various changes may be made in the circuit arrangement and in the values of the circuit constants without departing from the spirit or scope of the invention.

I claim:

1. In a television receiver adapted to receive a composite television signal having video and synchronizing components, which signal when received may be accompanied by noise, means responsive to the received signal for separating the synchronizing components substantially to the exclusion of noise, means for applying a bias to said first-named means to effect noise exclusion according to the value of said bias, means responsive to the received composite signal for producing an automatic-gain-control potential for said receiver, means for applying a bias to said last-named means to effect delay of said automatic-gain-control potential according to the value of the last-mentioned bias, and single manual control means for simultaneously varying said biases to effect optimum noise exclusion and optimum delay of said automatic-gain-control potential for different strengths of said composite signal, whereby to effect optimum operation of said receiver for different signal strengths.

2. A television receiver according to claim 1, wherein the required variations of the respective biases are opposite in sense to one another, and wherein said single manual control means effects simultaneous variation of the biases in opposite senses.

3. A television receiver according to claim 2, wherein the recited plural means for applying biases and for simultaneously varying the biases comprise an impedance interconnected between the means for separating synchronizing components and the means for producing an automatic-gain-control potential, a source of voltage and an impedance serially connected between each end of said first impedance and a point of fixed potential, and adjustable means for connecting selectable points of said first impedance to said point of fixed potential.

References Cited in the file of this patent

Rider's Television Manual, vol. 7; Philco TV, pp. 7–56. Copyrighted 1951.

Rider's Television Manual, vol. 14; Dumont TV, pp. 14–4. Copyrighted January 11, 1955.